United States Patent [19]

Mathis

[11] Patent Number: 4,900,116
[45] Date of Patent: Feb. 13, 1990

[54] MULTIPLE POLE OPTICAL FILTER

[75] Inventor: Ronald F. Mathis, Romona, Calif.

[73] Assignee: General Dynamics Corporation, Electronics Division, San Diego, Calif.

[21] Appl. No.: 292,398

[22] Filed: Dec. 30, 1988

[51] Int. Cl.$^4$ .................................................. G02B 6/26
[52] U.S. Cl. ................................ 350/96.15; 350/96.16
[58] Field of Search ............................ 350/96.15, 96.16

[56] References Cited

U.S. PATENT DOCUMENTS

| | | | |
|---|---|---|---|
| 3,936,142 | 2/1976 | Kersten | 350/96.15 |
| 4,325,604 | 4/1982 | Witte | 350/96.15 |
| 4,360,248 | 11/1982 | Bickel et al. | 350/96.15 X |
| 4,383,730 | 5/1983 | Witte | 350/96.15 X |
| 4,553,101 | 11/1985 | Mathis | 329/50 |
| 4,577,924 | 3/1986 | Mathis | 350/96.15 |
| 4,695,790 | 9/1987 | Mathis | 324/77 |
| 4,726,644 | 2/1988 | Mathis | 350/96.15 X |

*Primary Examiner*—John D. Lee
*Assistant Examiner*—Phan T. Heartney
*Attorney, Agent, or Firm*—Brown, Martin, Haller & McClain

[57] ABSTRACT

A multiple pole optical bandpass filter comprises at least two input filter elements each having an input at one end and an output at the opposite end, and an output filter element having at least two inputs at one end coupled to the respective outputs of the input filter elements, and an output at the opposite end. Each of the filter elements comprises a segment of multimode optical fiber of predetermined length having mirrors at its opposite input and output ends. An intensity modulated light signal is provided at one of the input filter element inputs, while the same signal shifted by 180 degrees is provided at the other input filter element input.

4 Claims, 2 Drawing Sheets

MULTIPLE POLE OPTICAL FILTER

BACKGROUND OF THE INVENTION

The present invention relates generally to RF filters and more particularly to optical RF bandpass filters.

In my U.S. Pat. No. 4,577,924, an optical RF bandpass filter was described which consisted of a multimode optical fiber segment having reflecting mirrors on each end so that it functioned as a resonant cavity with respect to a particular modulation frequency when the length of the fiber was equal to one half of the modulation wavelength of the light injected into the fiber. This type of filter can advantageously be used in many application for controlling or selecting frequencies transmitted, for example in electronic intelligence receivers, data busses, fast frequency hopping modems, and other signal processing applications.

My U.S. Pat. No. 4,726,644 described a fiber optic data bus and discussed coupling a pair of optical bandpass filters in series or cascade to produce a narrower passband. However, such cascade arrangements may result in significant insertion losses as a result of back reflections.

SUMMARY OF THE INVENTION

It is an object of the present invention to provide an improved optical bandpass filter in which greater control of the pass band shape can be achieved.

According to the present invention, a multiple pole optical bandpass filter is provided which comprises at least two input filter elements each having an input at one end and an output at the opposite end, and an output filter element having at least two inputs at one end coupled to the outputs of the input filter elements and an output at the opposite end. An intensity modulated light signal is coupled to the input of one of the input filter elements, and the same signal shifted by 180 degrees is coupled to the input of the other input filter element. Each of the filter elements comprises a segment of multimode optical fiber of predetermined length dependent on the modulation frequency and desired passband shape, the fiber segment having an input mirror at its input end and an output mirror at the opposite end.

The inputs may comprise directional couplers or holes in the mirrors. The output filter is preferably of larger core size than the input filters, which reduces losses as a result of back reflections.

With a three pole arrangement having two input filters and one output filter, improved control of the pass band shape can be achieved. For example, a response with a relatively flat top can be produced. The pass band shape may be controlled by adjusting individual filter parameters, such as the core diameter, filter lengths, input and output hole diameters, mirror reflectances, and refractive index of the core material. Since there are three poles, a higher degree of adjustability is possible than with a single pole filter.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENTS

Figure 1:
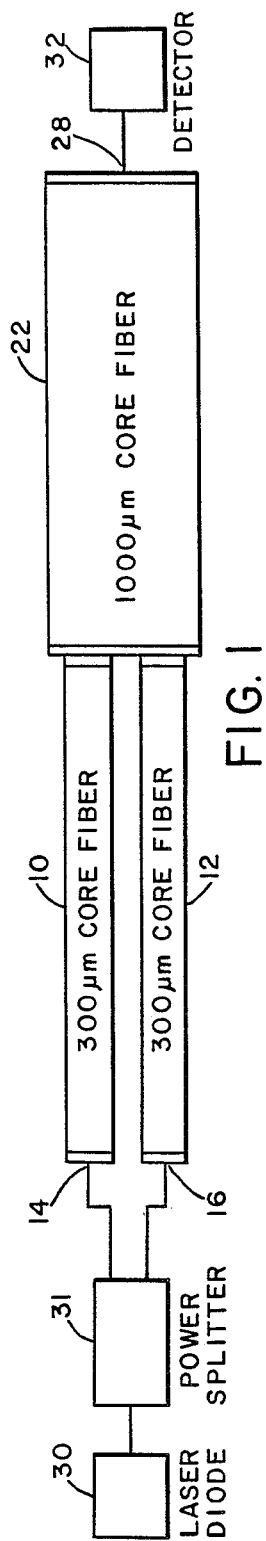
FIG. 1 is a schematic representation of a three pole optical filter according to a preferred embodiment of the present invention.
Figure 2:
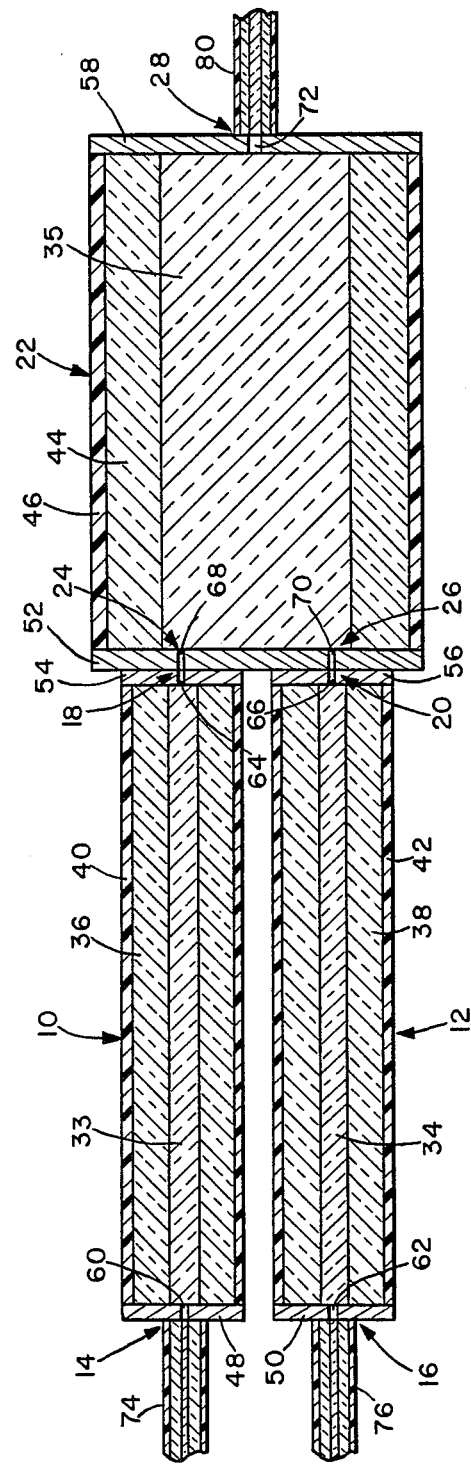
FIG. 2 is an enlarged partial sectional view showing the coupling between the filter elements of the filter of FIG. 1.

FIGS. 1 and 2 of the drawings illustrate a basic three pole optical bandpass filter according to a preferred embodiment of the present invention. The filter consists of two input filter elements 10,12 each having an input 14,16 at one end and an output 18,20 at the opposite end. The output ends of the filter elements 10 and 12 are coupled to an output filter element 22 having a pair of inputs 24,26 at one end coupled to the respective outputs 18,20 of the input filter elements, and an output 28 at the opposite end.

Input, intensity modulated light signals to the two input filter elements are provided by a laser diode 30 connected to a 1×2 power splitter 31 having outputs coupled to the respective inputs 14,16 of the filter elements. Alternatively, two laser diodes driven with the same signal can be used. In each case, the signal input to filter element 12 is the same as that input to element 10 but with a 180 degree phase shift. The output of filter element 22 is connected to a suitable optical detector 32 or other output device.

As best illustrated in FIG. 2, each filter element 10,12,22 consists of a multimode optical fiber segment, with input filters 10 and 12 having smaller cores 33,34 than the core 5 of output filter 22. Each filter element consists of an optical RF bandpass filter and may be made as described in my U.S. Pat. No. 4,577,924 entitled "Optical Recursive Filter." However, the sizes, materials and specific filter parameters described in that patent are examples only, and other filter materials and parameters may be selected according to the application and desired bandpass shape.

The filter cores 33,34 of input filter elements 10,12 are encased by claddings 36,38, which are further enclosed by buffer layers 40,42. Similarly, output filter core 35 is encased by cladding 44 further enclosed by buffer layer 46. Each fiber segment 10,12,22 has an input reflective coating or mirror 48,50,52, respectively, at one end and an output reflective coating or mirror 54,56,58 at the opposite or output end. The reflective coatings or mirrors are applied by appropriate means such as deposition after the end of the fiber has been ground flat and polished. The inputs to filter elements 10 and 12 are provided by holes 60,62 in the input mirrors 48,50 while the outputs are provided by holes 64,66 in mirrors 54,56. Output holes 64,66 are aligned axially with a pair of input holes 68,70 provided in input mirror 52 of the larger core filter element 22. The output of filter element 22 is provided by a hole 72 in mirror 58.

The input light signals are coupled from the power splitter outputs to the respective filter element inputs by means of single mode fibers 74,76 coupled to the input holes 60,62 in mirrors 54,56. The output light signal at output hole or output filter element 22 is connected via a multimode mode fiber 80 to optical detector 32. However, any suitable coupling means may be used in place of the fibers 74,76 and 80 if desired, such as by direct coupling to the light source in the case of the input filter elements, direct coupling to the detector in the case of the output filter element, or by means of optical waveguides.

As mentioned above, the core of output fiber segment or filter element 22 is larger than the core sizes of input filter elements 10,12. This helps to reduce insertion losses. In one example of the invention the output fiber core was of 1000 microns diameter while the input fiber cores were each of 300 microns. These parameters may be varied in order to change the filter response, as explained below. In the preferred embodiment shown, input filter elements 10 and 12 are of identical dimensions and are tuned to the RF carrier frequency. However, in some applications it may be desirable for these elements to be of different dimensions and to be tuned to different RF carrier in order to provide different response characteristics. The light input to filters 10 and 12 is filtered within the passband of these filters and output to filter 22, where it is combined and filtered in the passband of filter 22.

By making the output fiber or cavity larger than the input cavities, insertion losses as a result of back reflections can be reduced since light will be transmitted more readily from a smaller to a larger cavity than vice versa. Thus the percentage of light back reflected into the input fibers can be reduced.

The multiple pole optical bandpass filter of this invention is analogous to conventional multiple pole electrical filters, and can be designed in an equivalent manner to control the output pass band shape as will be understood from the theoretical analysis below, which illustrates how a transfer function can be generated for the three pole filter using coupled cavity theory. The following is a summary of the coupled cavity theory used to generate a transfer function for the three pole filter illustrated in FIGS. 1 and 2. The responses $Z_{11}(t)$, $Z_{12}(t)$ and $Z_2(t)$ of the respective filter elements 10,12 and 22 in the time domain are given by the following:

$$z_{11}(t) = \beta_1 X\left(t - \frac{\tau_{11}}{2} - \tau_1\right) + A_{11}z_{11}(t - \tau_{11}) + a_{11}\frac{A_{11}}{R_{21}} u_2(t - \tau_{e1} - \tau_{11}) \quad (1)$$

$$z_{12}(t) = \beta_2 X\left(t - \frac{\tau_{12}}{2}\right) + A_{12}z_{12}(t - \tau_{12}) + a_{12}\frac{A_{12}}{R_{22}} u_2(t - \tau_{e2} - \tau_{12}) \quad (2)$$

$$z_2(t) = a_{11}z_{11}\left(t - \tau_{e1} - \frac{\tau_2}{2}\right) + a_{12}z_{12}\left(t - \tau_{e2} - \frac{\tau_2}{2}\right) + A_2z_2(t - \tau_{12}) \quad (3)$$

$$u_2(t) = \frac{A_2}{R_2} z_2\left(t - \frac{\tau_2}{2}\right) \quad (4)$$

$$y(t) = a_2z_2(t) \quad (5)$$

After defining each of the above terms, it is possible to translate directly to the frequency domain through the Fourier Transform. Note that Table 1 contains all the variable definitions. Using upper case to denote transformed variables, $$Z_{11} = \frac{\beta_1 X e^{-iw(\frac{\tau_{11}}{2} + \tau_1)} + a_{11}\frac{A_{11}}{R_{21}} U_2 e^{-iw(\tau_{11} + \tau_{e1})}}{(1 - A_{11}e^{-iw\tau_{11}})} \quad (6)$$

$$Z_{12} = \frac{\beta_2 X e^{-iw\frac{\tau_{12}}{2}} + a_{12}\frac{A_{12}}{R_{22}} U_2 e^{-iw(\tau_{12} + \tau_{e2})}}{(1 - A_{12}e^{-iw\tau_{12}})} \quad (7)$$

$$Z_2 = \frac{a_{11}Z_{11}e^{-iw(\tau_{e1} - \frac{\tau_{12}}{2})} + a_{12}Z_{12}e^{-iw(\tau_{e2} + \frac{\tau_2}{2})}}{(1 - A_2e^{-iw\tau_2})} \quad (8)$$

Now we let $Y = Z_2 a_2$ and define, $$H(w) = \frac{Y}{X}$$

The variables or filter parameters utilized in these and subsequent equations are listed in Table 1 below:

TABLE 1

$\omega$ = $2\pi f$ angular Frequency
$d_{11}$ = Input hole diameter of filter 1
$d_{21}$ = Output hole diameter of filter 1
$D_{11}$ = Diameter of filter 1
$d_{12}$ = Input hole diameter of filter 2
$d_{22}$ = Output hole diameter of filter 2
$D_{12}$ = Diameter of filter 2
$d_{31}$ = Input hole diameter of filter 3
$d_{32}$ = Output hole diameter of filter 3
$D_3$ = Diameter of filter 3
$R_{11}$ = Reflectance of input mirror in cavity 1
$R_{21}$ = Reflectance of output mirror in cavity 1
$R_{12}$ = Reflectance of input mirror in cavity 2
$R_{22}$ = Reflectance of output mirror in cavity 2
$R_2$ = Reflectance of input mirror in cavity 3
$R_3$ = Reflectance of output mirror in cavity 3
$R_{max}$ = Maximum reflectance of mirrors
$F$ = Reflectance reduction factor due to end angles $$A_{11} = R_{max}F\left(1 - \left[\frac{d_{11}}{D_{11}}\right]^2\right)\left(1 - \left[\frac{d_{21}}{D_{11}}\right]^2\right)$$

$$A_{12} = R_{max}F\left(1 - \left[\frac{d_{12}}{D_{12}}\right]^2\right)\left(1 - \left[\frac{d_{22}}{D_{12}}\right]^2\right)$$

$$A_2 = R_{max}F\left(1 - \left[\frac{d_{31}}{D_3}\right]^2\right)\left(1 - \left[\frac{d_{32}}{D_3}\right]^2\right)$$

$B_1$ = Fraction of light getting through the input mirror of cavity 1
$B_2$ = Fraction of light getting through the mirror of cavity 2
$a_{11}$ = Fraction of light getting through the mirror traveling from cavity 1 to cavity 3

$$= 1 - \frac{R_{21}}{R_{max}}$$

$a_{12}$ = Fraction of light getting through the mirror traveling from cavity 2 to cavity 3

$$= 1 - \frac{R_{22}}{R_{max}}$$

$f_{11}$ = Feedback reduction factor for light traveling from cavity 3 to cavity 1
$f_{12}$ = Feedback reduction factor for light traveling from cavity 3 to cavity 2

TABLE 1-continued $a'_{11}$ = Fraction of light getting through the mirror traveling from cavity 3 to cavity 1
  = $a_{11}f_{11}$
$a'_{12}$ = Fraction of light getting through the mirror traveling from cavity 3 to cavity 2
  = $a_{12}f_{12}$
Note that the feedback reduction factors depend on hole positions and the mode distributions within the filters. The actual range of values will be determined experimentally.
n = Index of refraction for the core of all three cavities
$l_{11}$ = Physical length of cavity 1
$l_{12}$ = Physical length of cavity 2
$l_2$ = Physical length of cavity 3
$\tau_{11}$ = Round trip time for the light in cavity 1
  = $\frac{2nl_{11}}{c}$
$\tau_{12}$ = Round trip time for the light in the cavity 1
  = $\frac{2nl_{12}}{c}$
$\tau_2$ = Round trip time for the light in cavity 3
  = $\frac{2nl_2}{c}$
$\tau_1$ = Time delay of the light entering cavity 1 relative to cavity 2
$\tau_{e1}$ = Time delay of the light traveling from cavity 1 to cavity 3 after it exits cavity 1
$\tau_{e2}$ = Time delay of the light traveling from cavity 2 to cavity 3 after it exits cavity 2
$W_0$ = Center frequency of the three pole filter Using this definition we substitute into (8) for $Z_{11}$, $Z_{12}$, and $U_2$. We then multiply both top and bottom by:

$$(1-A_{11}e^{-iw\tau 11})(1-A_{12}e^{-iw\tau 12})(1-A_{12}e^{-iw\tau 2})$$

The transfer function then reduces to the following:

$$H(w) = [a_{11}a_2\beta_1 e^{-iw(\frac{\tau 11}{2} + \tau l)}(1 - A_{12}e^{-iw\tau 12}) + \quad (10)$$

$$a_{12}a_2\beta_2 e^{-iw\frac{\tau 12}{2}}(1 - A_{11}e^{-iw\tau 11})] \times$$

$$[(1 - A_{11}e^{-iw\tau 11})(1 - A_{12}e^{-iw\tau 12})(1 - A_2e^{-iw\tau 2}) -$$
$$k_1^2 A_{11}A_2 e^{-iw(\tau 11 + \tau 2 + 2\tau e1)} \times (1 - A_{12}e^{-iw\tau 12}) -$$

$$k_2^2 A_{12}A_2 e^{-iw(\tau 12 + \tau 2 + 2\tau e2)}(1 - A_{11}e^{-iw\tau 11})]^{-1}$$

where $$k_1^2 = \frac{a_{11}a_{11}}{R_{21}R_2} \quad (11)$$

$$k_2^2 = \frac{a_{12}a_{12}}{R_{22}R_2} \quad (12)$$

This form of the transfer function is exact. It is also important to note that the time delay $\tau_l$ can be approximately realized by launching the input signal on the opposite end of cavity one.

We should now like to relate H(w) to conventional electric filter theory. In general, we would like the denominator of H(w) to be in the following form:

$$[1 - (1 - K_1)A_{11}e^{-iw\tau 11}][1 - \quad (13)$$

-continued
$$(1 - K_2)A_{12}e^{-iw\tau 12}][1 - (1 + K_3)A_2e^{-iwt2}]$$

or after multiplying out $$(1 - A_{11}e^{-iw\tau 11})(1 - A_{12}e^{-iw\tau 11})(1 - A_2e^{-iw\tau 2}) - \quad (14)$$

$$K_2 A_{12}A_2 e^{-iw(\tau 2 + \tau 12)}(1 - A_{11}e^{-iw\tau 11}) -$$

$$K_1 A_{11}A_2 e^{-iw(\tau 2 + \tau 11)}(1 - A_{12}e^{-iwt\tau 12}) +$$

$$K_2 A_{12}e^{-iw\tau 12}(1 - A_{11}e^{-iw\tau 11}) + K_1 A_{11}e^{-iwt 11}(1 - A_{12}e^{-iw\tau 12}) +$$

$$K_1 K_2 A_{11}A_{12}e^{-iw(\tau 11 + \tau 12)}(1 - A_2e^{-iw\tau 2}) -$$

$$K_3 A_2 e^{-iw\tau 2}(1 - A_{11}e^{-iw\tau 11} + K_1 A_{11}e^{-iw\tau 11})(1 - A_{12}e^{-iw\tau 12} +$$

$$K_2 A_{12}e^{-iw\tau 12})$$

Now compare this with the denominator of H(w). If we let $$K_1 = k_1^2 e^{-i2w\tau e1} \quad (15)$$

$$K_2 = k_2^2 e^{-i2w\tau e2} \quad (16)$$

and set the last three lines of the above expression to zero, the match is exact.

In order to put the equations in a simple form we set $$1 - K_i = M_i e^{i\theta_i}; \quad i=1,2 \quad (17)$$

Now the $M_i\theta_i$ terms become phase and amplitude corrections to account for the fact that the cavities are coupled. Reasoning this way, $$1 - K_1 = 1 - k_1^2 e^{-i2w\tau e1} \quad (18)$$
$$= M_1 e^{i\theta_1}$$

where $$M_1 = [1 + k_1^4 - 2k_1^2\cos(2w\tau_{e1})]^{1/2} \quad (19)$$

and $$\theta_1 = \tan^{-1}\frac{k_1^2\sin(2w\tau_{e1})}{1 - k_1^2\cos(2w\tau_{e1})} \quad (20)$$

Similarly, $$1 - K_2 = 1 - k_2^2 e^{-i2w\tau e2} \quad (21)$$
$$= M_2 e^{i\theta_2}$$

where $$M_2 = [1 + k_2^4 - 2k_2^2\cos(2w\tau_{e2})]^{1/2} \quad (22)$$

and $$\theta_2 = \tan^{-1}\frac{k_2^2\sin(2w\tau_{e2})}{1 - k_2^2\cos(2w\tau_{e2})} \quad (23)$$

If we set the last three lines of the expression (14) to zero, it turns out that $(1+K_3)$ can be determined:

$$1 + K_3 = M_3 e^{i\theta_3} \quad (24)$$

$$= 1 + \quad (25)$$

-continued
$$\frac{E}{A_2 e^{-iw\tau_2}(1-(1-K_1)A_{11}e^{-iw\tau_{11}})(1-(1-K_2)A_{12}e^{-iw\tau_{12}})}$$

where $$E = K_1 A_{11} e^{iw\tau_{11}}(1 - A_{12}e^{-iw\tau_{12}}) +$$

$$K_2 A_{12} e^{iw\tau_{12}}(1 - A_{11}e^{-iw\tau_{11}}) +$$

$$K_1 K_2 A_{11} A_{12} e^{-iw(\tau_{11}+\tau_{12})}(1 - A_2 e^{iw\tau_2})$$

and after a fair bit of algebra $$M_3 e^{i\theta_3} = 1 + g_1 e^{iu_1} + g_2 e^{iu_2} + g_3 e^{iu_3} \quad (26)$$

where $$g_1 = \frac{k_1^2 A_{11} d_{12}}{A_2 B_1 B_2} \quad (27)$$

$$g_2 = \frac{k_2^2 A_{12} d_{11}}{A_2 B_1 B_2} \quad (28)$$

$$g_3 = \frac{k_1^2 k_2^2 A_{11} A_{12} d_2}{A_2 B_1 B_2} \quad (29)$$

$$u_1 = -[w(\tau_{11} + 2\tau_{e1} - \tau_2) - \phi_{12} + \mu_1 + \mu_2] \quad (30)$$

$$u_2 = -[w(\tau_{12} + 2\tau_{e2} - \tau_2) - \phi_{11} + \mu_1 + \mu_2] \quad (31)$$

$$u_3 = -[w(\tau_{11} + \tau_{12} - \tau_2 + 2\tau_{e1} + 2\tau_{e2}) - \quad (32)$$

$$\phi_2 + \mu_1 + \mu_2]$$

and $$d_{11} = (1 + A_{11}^2 - 2A_{11}\cos(\omega\tau_{11}))^{\frac{1}{2}} \quad (33)$$

$$d_{12} = (1 + A_{12}^2 - 2A_{12}\cos(\omega\tau_{11}))^{\frac{1}{2}} \quad (34)$$

$$d_2 = (1 + A_2^2 - 2A_2\cos(\omega\tau_2))^{\frac{1}{2}} \quad (35)$$

$$\phi_{11} = \tan^{-1}\frac{A_{11}\sin(w\tau_{11})}{1 - A_{11}\cos(w\tau_{11})} \quad (36)$$

$$\phi_{12} = \tan^{-1}\frac{A_{12}\sin(w\tau_{12})}{1 - A\cos(w\tau_{12})} \quad (37)$$

$$\phi_2 = \tan^{-1}\frac{A_2\sin(w\tau_2)}{1 - A_2\cos(w\tau_2)} \quad (38)$$

$$B_1 = [1 + M_1^2 A_{11}^2 - 2M_1 A_{11}\cos(\theta_1 - w\tau_{11})]^{\frac{1}{2}} \quad (39)$$

$$B_2 = [1 + M_2^2 A_{12}^2 - 2M_2 A_{12}\cos(\theta_2 - w\tau_{12})]^{\frac{1}{2}} \quad (40)$$

$$\mu_1 = \tan^{-1}\frac{M_1 A_{11}\sin(\theta_1 - w\tau_{11})}{1 - M_1 A_{11}\cos(\theta_1 - w\tau_{11})} \quad (41)$$

$$\mu_2 = \tan^{-1}\frac{M_2 A_{12}\sin(\theta_2 - w\tau_{12})}{1 - M_2 A_{12}\cos(\theta_2 - w\tau_{12})} \quad (42)$$

Now with all the previous definitions we can write equation (10) in the following form:

$$H(w) = [a_{11}a_2\beta_1 e^{-iw(\frac{\tau_{11}}{2}+\tau l)}(1 - A_{12}e^{-iw\tau_{12}}) + \quad (43)$$

$$a_{12}a_2\beta_2 e^{-iw\frac{\tau_{12}}{2}}(1 - A_{11}e^{-iw\tau_{11}})] \times [(1 -$$

$$M_1 A_{11} e^{-iw\tau_{11}+i\theta_1})(1 - M_2 A_{12} e^{-iw\tau_{12}+i\theta_2})(1 -$$

$$M_3 A_2 e^{-iw\tau_2+i\theta_3})]^{-1}$$

Each term in the denominator is a single pole corrected for the coupling of three poles. The location of the pole is dependent on frequency and can therefore only be exact at the center frequency. In order to determine the pole location, we relate each term in the denominator to the conventional expression for a single pole. Considering a single term we drop the subscripts for simplicity and write:

$$(iw + \alpha - i\beta) = 1 - MAe^{-iw\tau + i\theta} \quad (44)$$

Now we define $w_o$ such that $\tau w_o = 2\pi$ and rewrite (44) as:

$$(iw + \alpha - i\beta) = 1 - MAe^{-i[(w-w_0)\tau + \theta]} \quad (45)$$

Assuming that $w \sim w_o$ and $\theta << 1$, then $$(iw + \alpha_i - i\beta_i) = 1 - MA[1 - iw\tau + iw_0\tau + i\theta] =$$

$$MAw_0\tau\left[\frac{1 - MA}{MAw_0\tau} + i\frac{w}{w_0} - i\frac{w_0\tau + \theta}{w_0\tau}\right]$$

Comparing term by term and neglecting the constant, $$\alpha = \frac{1 - MA}{MA\tau w_0}; \beta = \left(\frac{2\pi}{w_0} + \frac{\theta}{w_0}\right)\frac{1}{\tau}$$

then $$A = \frac{\frac{1}{M}}{1 + 2\pi + \theta\frac{\alpha}{\beta}}; \tau = \frac{2\pi + \theta}{w_0\beta} \quad (46)$$

A separate pair of expressions is required for each of the three terms in the denominator of (43). Note that this derivation takes $w_o$ to be the center frequency of the individual filter seciton. In practice $w_o$ can be set to the center frequency of the combined three section filter since the resulting error is small.

This completes the derivation of the transfer function for the three pole filter. Note that a link was derived between a conventional filter and fiber optic filter. This allows the use of conventional filter theory to design our filters. It is also important to understand that although the above equations are in closed form it is not possible to solve for each of the variables individually. Thus solution to these sets of equations requires iterative techniques on a digital computer.

The parameters of the three pole filter of FIGS. 1 and 2 can be selected according to the theory outlined above. Once a desired center frequency and passband shape is selected, the filter equations can be solved on a computer to produce the necessary filter parameters, such as length, core diameter, hole size, and so on. In other words, it will be understood that the transfer function, and thus the passband shape, can be controlled by adjusting the individual filter parameters listed in Table 1. Clearly this arrangement gives greater control of the passband shape by adjustment of the various parameters of the three filter elements.

Figure 3:
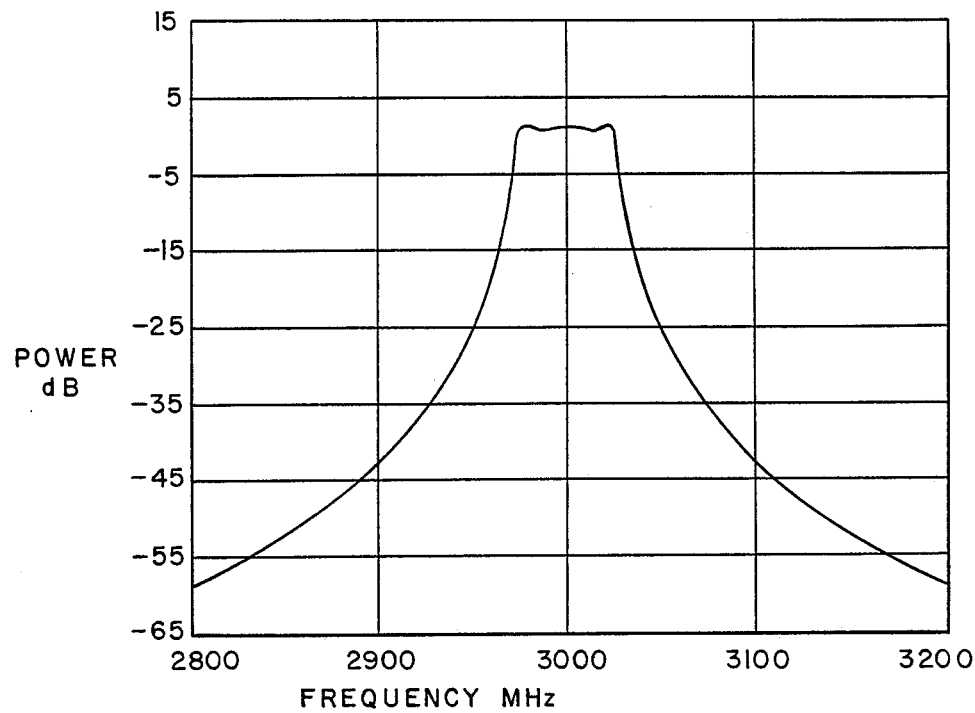
FIG. 3 is a graph illustrating an expected response (signal power with respect to frequency) of the three pole filter illustrated in FIGS. 1 and 2.

FIG. 3 illustrates a calculated response utilizing the above theory with a three pole filter as illustrated in FIGS. 1 and 2 centered at 3 GHz with a frequency span from 2.8 GHz to 3.2 GHz.

The filter parameters were as follows:

| | | | | | |
|---|---|---|---|---|---|
| $f$ | = | 2.8–3.2 GHz | $B_1$ | = | 1 |
| $d_{11}$ | = | 5 μm | $B_2$ | = | 1 |
| $d_{21}$ | = | 68.9 μm | $F_{11}$ | = | 0.7 |
| $D_{11}$ | = | 600 μm | $F_{12}$ | = | 0.7 |
| $d_{12}$ | = | 5 μm | $n$ | = | 1.4685 |
| $d_{22}$ | = | 69.4 μm | $l_{11}$ | = | 3.37840 cm |
| $D_{12}$ | = | 600 μm | $l_{12}$ | = | 3.42708 cm |
| $d_{31}$ | = | 68.9 μm | $l_2$ | = | 3.40255 cm |
| $d_{32}$ | = | 69.4 μm | $\tau_1$ | = | 0.16785 ns |
| $D_3$ | = | 1000 μm | $\tau_{e1}$ | = | 0 |
| $R_{11}$ | = | 0.999831 | $\tau_{e2}$ | = | 0 |
| $R_{21}$ | = | 0.986726 | | | |
| $R_{12}$ | = | 0.999831 | | | |
| $R_{22}$ | = | 0.986536 | | | |
| $R_2^1$ | = | 0.991938 | | | |
| $R_3$ | = | 0.980477 | | | |
| $R_{max}$ | = | 0.9999 | | | |
| $F$ | = | 1 | | | |

As illustrated, by utilizing these filter parameters, a relatively narrow pass band with a flat top can be produced. The insertion loss was calculated to be only =8 dB. Clearly, various desired passband shapes, center frequencies and bandwidths can be provided by suitably varying the filter parameters.

The drawings illustrate a three pole fiber optic bandpass filter. However, filters with a larger number of poles may be provided in a similar fashion by having more than two input filter elements connected to a single output filter element of larger size.

The bandpass filter of this invention provides a simple, compact means of combining fiber optic filters to form a multiple pole filter. The insertion losses will be less than for a simple cascade, and the passband shape can be controlled by adjusting the individual filter parameters. The multiple pole bandpass filter described has many possible signal processing applications, including spectrum analyzers, electronic intelligence receivers, fast frequency hopping modems, data busses, high resolution radar receivers, and so on.

Although a preferred embodiment of the invention has been described above by way of example only, it will be understood by those skilled in the field that modifications may be made to the disclosed embodiment without departing from the scope of the invention, which is defined by the appended claims.

I claim:

1. A multipole pole optical bandpass filter, comprising:
   at least two input filter elements, each having an input mirror at one end and an output mirror at the opposite end, each input mirror having an input hole and each output mirror having an output hole;
   a single output filter element of a diameter larger than each of the input filter elements and having an input mirror at one end and an output mirror at the opposite end, the input mirror having at least two input holes at one end aligned with and coupled to the respective output holes of the input filter elements and an output hole in the output mirror at the opposite end;
   input means connected to the input holes of said input filter elements for providing an intensity modulated signal at one of the inputs and the same signal shifted by exactly 180 degrees at the other input;
   each of said filter elements comprising a segment of multimode optical fiber of predetermined length.

2. The filter as claimed in claim 1, wherein each fiber segment comprises a core and a cladding of different refractive index, the output filter element core being of larger diameter than the cores of the input filter elements.

3. The filter as claimed in claim 2, wherein the output filter element has a core diameter more than double that of each input filter element.

4. The filter as claimed in claim 3, wherein each input filter element has a core diameter of 300 microns and the output filter element has a core diameter of 1000 microns.

* * * * *